United States Patent Office 2,996,668
Patented Aug. 15, 1961

2,996,668
STROBOSCOPE
Rudolf Greiner, Eichenweg 14, Langenthal, Switzerland
Filed Oct. 7, 1960, Ser. No. 61,216
Claims priority, application Switzerland Feb. 15, 1960
7 Claims. (Cl. 324—79)

This invention relates to a stroboscope and more particularly to a stroboscope for comparing the frequency of two alternating-current phenomena, wherein one of said alternating-current phenomena is supplied to a synchronous motor and the other alternating-current phenomenon is supplied to a flashlight tube.

Objects of the invention are to improve a stroboscope of the type stated with respect to its accuracy and its stability, to simplify the electrical circuits and the number of auxiliary equipments and to allow a direct indication of the frequency comparison carried out.

The improvements are obtained, in accordance with the invention, by the use of a stator of the synchronous motor which is rotatably mounted about an axis of rotation coinciding with the axis of rotation of the rotor of said synchronous motor and by the use of a continuously variable speed gear through which said rotatable stator is mechanically coupled to said rotor so that said stator can be rotated at an adjustable speed which is only a small fraction of the speed of said rotor. Another object of the invention is a stroboscope of the kind outlined, wherein said continuously variable speed gear is a combined speed reduction and speed reversing gear and wherein means for manually adjusting said gear are provided in order to find the speed and the direction of rotation of the stator of said synchronous motor at which no stroboscopic motion of the flash emitted from said flashlight tube is visible, so that the adjustment of said adjusting means necessary for this represents a measure of the frequency difference of the two alternating-current phenomena.

These and other objects and advantages of the invention will best be understood from the following description of a specific embodiment when read in connection with the accompanying drawing in which.

Figure 1:
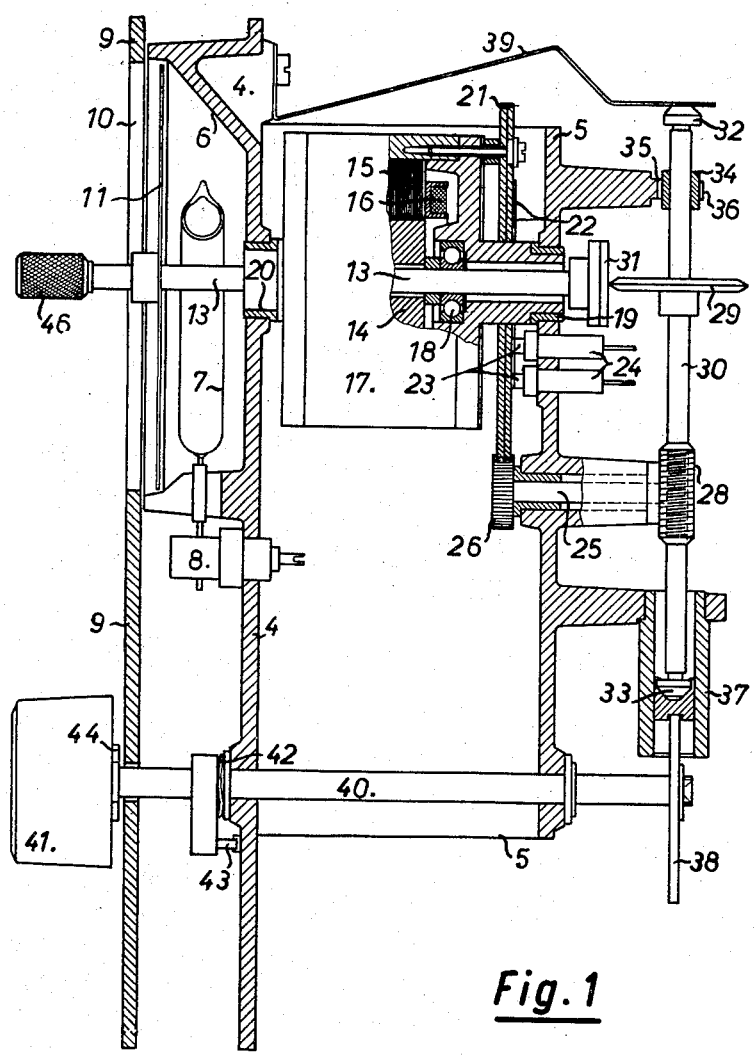
FIG. 1 shows a longitudinal section through a stroboscope, substantially through the axis of the synchronous motor.
Figure 2:
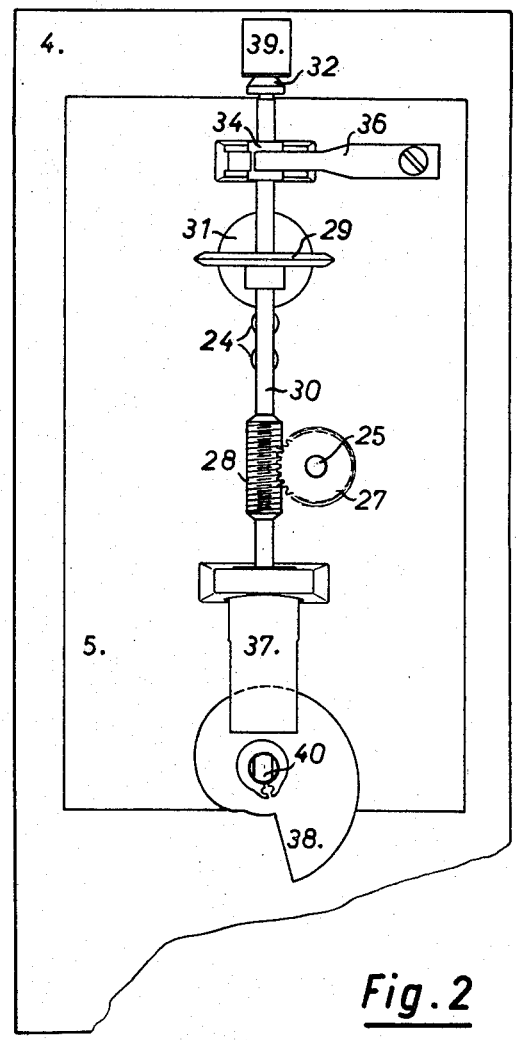
FIG. 2 shows a rear view of the frame of the stroboscope with a plan view of the continuously variable reversing and speed reduction gear.
Figure 3:
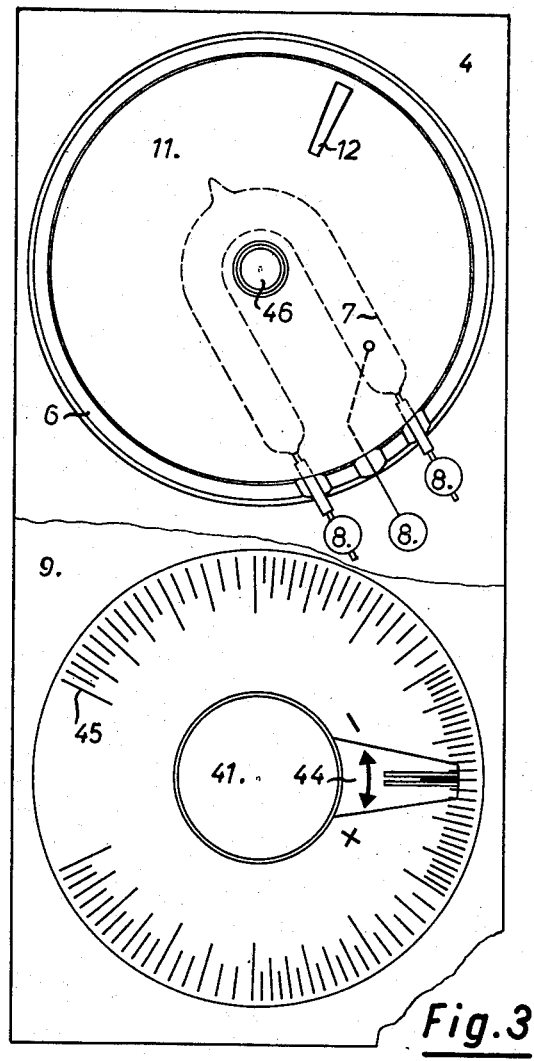
FIG. 3 shows a front view of the stroboscope, the front panel being represented partly broken away.

The frame of the stroboscope comprises a front mounting plate 4 and a rear intermediate member 5 of substantially angled formation. The intermediate member 5 is rigidly secured to the mounting plate 4 by means of screws which are not illustrated. The mounting plate 4 comprises a box-like lamp housing 6 in which the stationarily mounted flashlight tube 7 is accommodated. This is held by means of its current connections in insulators 8 which are secured in the mounting plate 4. On the face of the lamp housing 6 there lies a thin front panel 9 which is provided with a viewing aperture 10 adapted to the lamp housing 6. The front panel 9 may be secured in a detachable manner to the mounting plate 4, for example by means of screws or the like which are not illustrated. In front of the flashlight tube 7 and still inside the lamp housing 6 there is provided a slotted disc 11 which serves as an indicator member and which comprises a narrow sector-shaped slot 12. The slotted disc 11 is mounted on one end of the rotor shaft 13 of a synchronous motor of which the rotor 14 is provided in known manner with salient poles and/or permanent magnets. The stator 15 of the synchronous motor carries a single- or polyphase winding 16 and is secured in the stator housing 17. The rotor shaft 13 is mounted for rotation in relation to the stator housing 17 by means of ball bearings 18. The stator housing 17 is in turn mounted for rotation in the frame (4, 5) of the stroboscope by means of the two plain bearings 19 and 20 about an axis which coincides with the axis of rotation of the rotor shaft 13. Finally, screwed to the stator housing 17 is a gearwheel 21 consisting of insulating material which simultaneously serves as a carrier for a plurality of slip-rings 22 which are concentric with one another. The slip-rings 22 are connected to the ends of the winding 16 although this is not shown in detail. The supply of alternating current to the slip-rings 22 is effected through brushes 23, of which the insulating housings 24 are secured in the intermediate member 5. Also mounted in the latter is the intermediate shaft 25 of a reduction gear. The one gearwheel 26 is secured to the intermediate shaft 25 and is in mesh with the gearwheel 21, the other gearwheel 27 secured to the intermediate shaft 25 is in mesh with a worm 28. The ratio of this reduction gear is selected in such a manner that the speed of rotation of the stator housing 17—and hence also the speed of the stator 15 and its winding 16—is, for example, about 200 times slower than the speed of rotation of the worm 28. The latter is in turn secured, together with the take-off wheel 29, to the axially displaceable shaft 30 of a friction gear of which the driving disc wheel 31 is mounted on the end of the rotor shaft 13 remote from the slotted disc 11. The friction gear illustrated (29 to 34) represents a continuously variable reversing gear which has in the middle of its variation range the speed ratio zero so that merely by axial displacement of the wormshaft 30, the stator 15 can be rotated in a continuously variable manner in one direction or the other and at a variable speed, while the driving rotor 14 runs with a constant direction of rotation.

The axial mobility of the wormshaft 30 is afforded by two thrust bearings 32 and 33 and one radial bearing 34. The radial bearing 34 is guided in a slide rail 35 provided in the intermediate member 5. It is urged by means of a leaf spring 36 in a direction which presses the take-off wheel 29 adequately against the disc wheel 31. Furthermore, the one thrust bearing 33 is guided for axial displacement in a sleeve 37 and is in contact with a camplate 38. The other thrust bearing 32 is subject to the influence of another leaf spring 39 which tends to urge the shaft 30 towards the camplate 38 so that the axial position of the shaft 30 is always determined by the particular position of the camplate 38. The camplate 38 is mounted direct on a shaft 40 which is mounted for rotation in the frame (4, 5) and which is provided, at the end projecting beyond the front panel 9, with an adjusting knob 41. A friction brake 42, which acts between the shaft 40 and the mounting plate 4, prevents accidental displacement of the shaft 40 and of the camplate 38 secured thereon. Furthermore, a limit stop 43 is provided which limits the angle of rotation of the shaft 40. Finally, secured to the adjusting knob 41 is a pointer 44 which, in conjunction with a graduated scale 45 is provided on the front panel 9, represents a means for reading the frequency comparison carried out. If the synchronous motor (14 to 17) is not self-starting, a rotary starting knob 46 may be provided on the rotor shaft 13 in order to start the synchronous motor in the desired direction of rotation.

The drawing illustrates the zero setting of the friction gear which simultaneously acts as a reversing gear, in which position the wheel 29 is in contact with the disc wheel 31 precisely in the centre thereof. There is then a speed ratio of zero between the rotor 14 and the stator 15 and the stator 15 is arrested. Accordingly, the rotor shaft 13 will run in relation to the frame (4, 5) at the synchronous speed determined by the number of poles in the synchronous motor. If the longitudinal position of the displaceable shaft 30 is now adjusted by means of the adjusting knob 41 in such a manner that the wheel 29 is in contact with the disc wheel 31 outside the centre thereof, then the stator 15 will likewise rotate in relation to the frame (4,5) at a certain greatly reduced speed. If the stator 15 rotates in the same direction as the rotor 14, then the rotor shaft 13 will rotate at the sum of the synchronous speed and the stator speed. Conversely, if the stator 15 rotates in the opposite direction in relation of the rotor 14, the rotor shaft 13 will rotate at a speed which is equal to the synchornous speed less the stator speed. Thus the differences between the speed of the rotor shaft and the synchronous speed of the synchronous motor are determined, as regards magnitude and sign, exclusively by the mechanical transmission ratio between the stator 15 and the rotor 14. Apart from this, said differences in speed are likewise proportional to the synchronous speed, and the proportionality factor can be varied in the device described between 0 and about ±0.003. Accordingly, the speed of rotation of the rotor shaft 13 can be varied continuously between 0.997 and 1.003 times the synchronous speed. Thus the graduated scale 45 may be calibrated either directly in units of the synchronous speed or in differences from the synchronous speed.

When the stroboscope is used in practice, the alternating-current phenomenon which is to be compared as regards its frequency is applied—possibly with the interposition of an electronic amplifier producing brief voltage impulses—to the connection terminals of the flashlight tube 7. The synchronous motor (14 to 17) is connected, through the brushes 23, to an alternating-current generator supplying the comparative frequency. Its frequency need not be variable and it is an advantage to use an alternating-current generator with a highly constant frequency such as a crystal-controlled tube generator. The whole frequency-comparison operation now consists in observing the flash visible through the rotating disc 11 and finding that position of the adjusting knob 41 at which the flash emitted from the flashlight tube 7 remains stationary. The pointer 44 then indicates directly on the graduated scale 45, the existing frequency or frequency difference.

Because of the great accuracy which can be obtained, the stroboscope described is particularly suitable for quickly determining the running of clocks and watches, the ticks of the clock or watch being converted into electrical signals which are supplied, electrically amplified, to the flashlight tube 7, and the synchronous motor (14 to 17) being fed with a suitable standard frequency. In this case, the scale 45 can be calibrated directly in seconds and minutes which show the deviation in running per day.

The invention is not limited to the particular embodiment here shown and described. Various modifications may be made in the stroboscope without departing from the spirit and scope of the invention as set forth in the following claims.

I claim:

1. A stroboscope for comparing the frequency of two alternating-current phenomena comprising a frame, a synchronous motor including a stator, a stator winding and a rotor, means for rotatably mounting said rotor with respect to said stator, means for rotatably mounting said stator with respect to said frame about an axis coinciding with the axis of rotation of said rotor, means for supplying one of said alternating-current phenomena to said stator winding, a shaft secured to said rotor, a lamp housing in said frame and surrounding said shaft, a flashlight tube mounted inside said lamp housing, means for supplying the other of said alternating-current phenomena to said flashlight tube, a slotted indicator disc secured to said shaft and extending in front of said flashlight tube, a continuously variable speed gear mounted in said frame through which said stator is mechanically coupled to said rotor so that said stator can be rotated at an adjustable speed, and means for manually adjusting the transmission ratio of said variable speed gear in order to find the transmission ratio between said stator and said rotor at which no stroboscopic motion of the flash emitted from said flashlight tube is visible through said slotted indicator disc, so that the position of said adjusting means necessary for this represents a measure of the frequency difference of said two alternating-current phenomena.

2. The invention as recited in claim 1, wherein said continuously variable speed gear comprises a reduction gear so that the stator of the synchronous motor can be rotated at a speed which is a small fraction of the speed of its rotor.

3. The invention as recited in claim 2, wherein said reduction gear comprises a worm drive.

4. A stroboscope for comparing the frequency of two alternating-current phenomena comprising a frame, a synchronous motor the stator of which is mounted for rotation about an axis coinciding with the axis of rotation of its rotor, means for supplying one of said alternating-current phenomena to a winding on said stator, an indicator member driven from said rotor, a flashlight tube, means for supplying the other of said alternating-current phenomena to said flashlight tube, a continuously variable speed reversing gear mounted in said frame through which said stator can be driven from said rotor at an adjustable speed and in one direction of rotation or the other, and means for adjusting the transmission ratio of said variable speed reversing gear in order to find the speed and the direction of rotation of said stator at which no stroboscopic motion of the flash emitted from said flashlight tube is visible, so that the position of said adjusting means necessary for this represents a measure of the frequency of one of said alternating-current phenomena with respect to the other alternating-current phenomenon.

5. The invention as recited in claim 4, wherein said continuously variable speed reversing gear has in the middle of its variation range the transmission ratio zero so that in this zero position the stator is arrested and the rotor is rotating with the synchronous speed.

6. The invention as recited in claim 5, wherein said continuously variable speed reversing gear is a friction gear of which the driving disc wheel is driven by the rotor of the synchronous motor and of which the take-off wheel is secured to a shaft which is axially displaceable.

7. The invention as recited in claim 6, wherein said axially displaceable shaft of the friction gear is adjusted by means of a camplate which in turn is secured to a shaft provided with an operating knob.

References Cited in the file of this patent

UNITED STATES PATENTS

| | | |
|---|---|---|
| 1,889,128 | McClintock | Nov. 29, 1932 |
| 2,503,628 | McBride | Apr. 11, 1950 |
| 2,841,045 | Dickey | July 1, 1958 |